United States Patent [19]
Maus

[11] Patent Number: 6,136,450
[45] Date of Patent: Oct. 24, 2000

[54] HONEYCOMB BODY, IN PARTICULAR A CATALYTIC CONVERTER CARRIER BODY, WITH A REINFORCED WALL STRUCTURE

[75] Inventor: Wolfgang Maus, Bergisch Gladbach, Germany

[73] Assignee: Emitec Gesellschaft fuer Emissionstechnologie mbH, Lohmar, Germany

[21] Appl. No.: 09/368,136

[22] Filed: Aug. 4, 1999

Related U.S. Application Data

[63] Continuation of application No. PCT/EP98/00438, Jan. 28, 1998.

[30] Foreign Application Priority Data

Feb. 4, 1997 [DE] Germany ............................ 197 04 129

[51] Int. Cl.[7] ............................... B32B 3/28; B01J 35/04; F01N 3/28
[52] U.S. Cl. ........................................ 428/593; 502/527.22
[58] Field of Search ................................... 428/593, 603, 428/592; 502/527.22; 422/180

[56] References Cited

U.S. PATENT DOCUMENTS

| | | | |
|---|---|---|---|
| 4,713,361 | 12/1987 | Maus | 428/593 |
| 4,803,189 | 2/1989 | Swars | 502/527.22 |
| 5,102,743 | 4/1992 | Maus et al. | 428/593 |
| 5,105,539 | 4/1992 | Maus et al. | 422/180 |
| 5,163,291 | 11/1992 | Hitachi et al. | 422/180 |
| 5,328,774 | 7/1994 | Maus et al. | 428/593 |
| 5,411,711 | 5/1995 | Swars | 422/177 |
| 5,567,395 | 10/1996 | Okabe et al. | 422/180 |
| 5,632,961 | 5/1997 | Sheller | 428/593 |
| 5,865,864 | 2/1999 | Bruck | 55/482 |

*Primary Examiner*—John J. Zimmerman
*Attorney, Agent, or Firm*—Herbert L. Lerner; Laurence A. Greenberg; Werner H. Stemer

[57] ABSTRACT

A honeycomb body, in particular a catalytic converter carrier body, with stacked and/or wound sheet layers of which at least a portion are structured sheet layers, thus forming passages through which a fluid can flow. A portion of the sheet layers is of a first thickness and a portion of the sheet layers is of a second thickness which is greater than the first thickness. The honeycomb body contains in its interior a lattice-like structure that is formed from at least two sheet layers of the second thickness, of which at least one is a structured sheet layer and which at least in a location-wise manner are connected together by a procedure involving the intimate joining of materials. Honeycomb bodies according to the invention, while affording good stability, can have particularly thin sheet layers whereby at least locally they have a particularly low thermal capacity.

12 Claims, 2 Drawing Sheets

HONEYCOMB BODY, IN PARTICULAR A CATALYTIC CONVERTER CARRIER BODY, WITH A REINFORCED WALL STRUCTURE

CROSS-REFERENCE TO RELATED APPLICATION

This is a continuation of copending International Application PCT/EP98/00438, filed Jan. 28, 1998, which designated the United States.

BACKGROUND OF THE INVENTION 1. Field of the Invention

The present invention concerns a honeycomb body having stacked and/or wound sheet layers of which some of the sheet layers are structured sheet layers forming passages in which a fluid can flow. Honeycomb bodies of this kind are used for example for the catalytic conversion of exhaust gases of an internal combustion engine.

European Patent EP 0 436 533 B1 discloses honeycomb bodies which contain a stack, twisted in mutually opposite directions, of at least partially structured metal sheets in a tubular casing. One or more of the sheet layers of the stack is of greater thickness than the other layers, wherein the layer or layers contain or contains a thicker sheet or a plurality of thin sheets which bear closely against each other. The thicker and thinner sheet layers form walls of passages, through which the exhaust gas stream can flow. The sheet layers are connected to the tubular casing, at least in portions thereof, by a procedure involving intimate joining of the materials involved. The thicker sheet layers cannot be easily torn away at the tubular casing, by virtue of their greater mechanical strength. In addition they can also hold fast the thinner sheet layers which are adjacent thereto so that they also cannot be torn away from the tubular casing or however are held fast by the thick sheet layer at least in spite of being torn away at the tubular casing. The individual metal sheet layers of the stack can be soldered together, preferably at one of the two ends of the honeycomb body. The above-described configuration, by virtue of the thick sheet layers, affords a wall structure for stabilizing the honeycomb body.

In recent years the development of new honeycomb bodies has been along the lines of reducing thermal capacity. With a lower thermal capacity it is possible to achieve in particular improved cold start performance when using the honeycomb bodies in exhaust gas catalytic converters. The ignition temperature as from which the catalytic procedure begins is achieved earlier. Besides thermal capacity the pressure drop which occurs in a gas flow through the honeycomb body also plays a part in development. The pressure drop should be as low as possible. Both development aims, namely a low thermal capacity and a low pressure drop, can be achieved by the use of thin passage walls. However the passage walls cannot be made of just any arbitrarily thin dimension as the wall structure otherwise becomes unstable and is damaged under thermal and/or mechanical loadings.

SUMMARY OF THE INVENTION

It is accordingly an object of the invention to provide a honeycomb body, in particular a catalytic converter carrier body, with a reinforced wall structure that overcomes the above-mentioned disadvantages of the prior art devices of this general type, which enjoys a high level of stability.

With the foregoing and other objects in view there is provided, in accordance with the invention, a honeycomb body including a catalytic converter carrier body, including sheet layers being at least one of stacked and wound sheet layers having an interior, part of the sheet layers being structured sheet layers having passage wall surfaces defining a passage through which a fluid can flow, some of the sheet layers having a first thickness and others of the sheet layers having a second thickness being greater than the first thickness, at least two of the sheet layers of the second thickness forming a lattice-shaped structure in the interior and at least one of the at least two of the sheet layers of the lattice-shaped structure being a structured sheet layer and the at least two of the sheet layers of the lattice-shaped structure connected together at least in a location-wise manner by a procedure involving intimate joining of materials, a larger portion of the passage wall surfaces in the interior formed by the sheet layers of the first thickness than by the sheet layers of the second thickness and the first thickness being between 15 $\mu$m and 50 $\mu$m.

A honeycomb body according to the invention has sheet metal layers of a first thickness and sheet metal layers of a second thickness, wherein the second thickness is greater than the first thickness. In its interior the honeycomb body contains a lattice-like structure which is formed from at least two sheet layers of the second thickness. Of those sheet layers at least one is a structured sheet layer. The at least two sheet layers are connected together at least in a location-wise manner by a procedure involving intimate joining of materials, preferably by being soldered together.

The reference to "a" thickness of a sheet layer denotes the mean thickness of the sheet material, while the local thickness can vary by some percent of the mean thickness.

The connecting locations are point-like, line-like or surface-like. Connections involving intimate joining of the materials involved exist preferably over the entire length of the lattice-like structure, that is to say in the direction of flow through the passages, and transversely with respect to the direction of flow through the passages. A crucial consideration in terms of the stability of the honeycomb body is adequate inherent stability of the lattice-like structure. The connections involving intimate joining of the materials are therefore preferably continuous or disposed at suitable spacings. Depending on the configuration of the honeycomb body and the purpose of use however a connection involving intimate joining of the material involved is under some circumstances also adequate at the ends of the passages, that is to say at the ends of the honeycomb body.

An advantage of the invention is that honeycomb bodies with thin walls can be of a stable structure. By virtue thereof it is possible for example to achieve a high cell density, that is to say a large number of passages per unit area in the cross-section of the honeycomb body, without having to tolerate the disadvantage of a high pressure drop. A high cell density has a favorable effect on the catalytic conversion of exhaust gases as it is possible to achieve a large catalytically active surface area per unit volume of the honeycomb body.

In cold start phases or re-starting phases of an internal combustion engine with an exhaust gas catalytic converter it is important for the catalytic converter to reach the ignition temperature as quickly as possible. Thin walls permit that to occur, by virtue of their low thermal capacity. The crucial consideration is that the ignition temperature is reached quickly, at least locally at the thin walls. There is however no need for it to be attained approximately simultaneously everywhere in the catalytic converter as the chemical reactions which take place after the ignition temperature is attained are exothermic. The zones in which the ignition temperature is reached or exceeded therefore rapidly spread.

The use of honeycomb bodies according to the invention results in early initiation of the catalytic procedure in exhaust gas catalytic converters. With the sheet layers of the first and second thicknesses receiving an approximately uniform incident flow of hot exhaust gas the catalytic procedure begins at the (thinner) sheet layers of the first thickness and rapidly spreads to the sheet layers of the second thickness. In comparison with honeycomb bodies of the same thermal capacity in respect of the sheet layers but only with sheet layers of one thickness, the catalytic procedure begins more quickly in the invention of the instant application. However it still begins more quickly even when the thermal capacity of the sheet layers of the honeycomb body according to the invention is greater, as long as there are thinner sheet layers.

The connection by the intimate joining of the materials involved is preferably effected after the step of stacking and/or winding or coiling the sheet layers. Otherwise the sheet layers of the first thickness could be damaged, for example torn through, by the sheet layers of the second thickness or the lattice-like structure.

The sheet layers are preferably soldered together. For soldering the lattice-like structure it is possible to consider all known soldering procedures in which finishing of the soldering operation is possible after stacking and/or winding or coiling of the sheet layers. In particular it is also possible to use different soldering processes for soldering the lattice-like structure and soldering the other sheet layers. For example solder foils or solder wires can be wound in between the sheet layers of the lattice-like structure. In that way solder joints can also be produced in the interior of the honeycomb body, within the lattice-like structure, while the other sheet layers are for example soldered together and to the lattice-like structure only at the ends of the honeycomb body.

In regard to the honeycomb body according to the invention there are configurations with a plurality of lattice-like structures which are preferably uniformly distributed over the stack or winding of the sheet layers.

A honeycomb body according to the invention is for example constructed with partially structured sheets, as described in the European Patent EP 0 436 533 B1. The passage walls formed by sheet layers are preferably of a thickness that remains approximately the same over the axial length of the honeycomb body. There are however also embodiments in which the reinforced lattice-like wall structure extends only over one or more portions of the axial length of the honeycomb body. That can be achieved for example by portion-wise reinforcement of the sheet layers with shorter sheet layers.

In a further embodiment with structured sheet layers the structures have line-like raised portions or ridges with which they contact adjacent sheet layers. At least two adjacent sheet layers which are structured in that way are in mutual contact with raised portions or ridges which extend in mutually crossed relationship so that they only touch each other in approximately point-wise manner. Those sheet layers are sheet layers of the second thickness and at a plurality of the contact points are connected together by a procedure using intimate joining of the materials involved, preferably by being soldered together, thus affording a three-dimensional lattice-like wall structure which stabilizes the honeycomb body.

An advantage of the honeycomb body according to the invention is that forces which act on the lattice-like wall structure in directions in which, at any event at the locations at which the forces act, no sheet layers of the second thickness extend, can also be carried away by way of the lattice-like wall structure.

A further advantage of the honeycomb body according to the invention is that of a favorable vibration characteristic. Due to its stable construction the lattice-like structure is insensitive to vibration. In addition however it also reduces the vibration lengths, perpendicularly to the axial length of the honeycomb body, of the regions with thinner sheet layers. The vibration lengths can be matched to a given purpose of use of the honeycomb body. Care is to be taken to ensure that no resonance vibrations of the honeycomb structure are induced.

In a development of the honeycomb body according to the invention a larger part of the passage wall surfaces in the interior of the honeycomb body is formed by the sheet layers of the first thickness than by the sheet layers of the second thickness, with the first thickness being at least 20% less than the second thickness.

In an embodiment of the honeycomb body the first thickness is of a value of between 15 $\mu$m and 50 $\mu$m, preferably about 20–30 $\mu$m.

In an advantageous development, the honeycomb body has a tubular casing, in the interior of which the sheet layers are disposed, wherein the lattice-like structure has a plurality of casing connecting locations at each of which at least a respective one of its sheet metal layers of the second thickness is connected to the tubular casing. That configuration can provide a stable unit containing the tubular casing and the lattice-like structure. An advantageous development thereof is one in which two casing connecting locations are connected together by the lattice-like structure.

An embodiment of the honeycomb body according to the invention provides for the formation of passages through which a fluid can flow and which extend in substantially parallel relationship and which are approximately closed off relative to each other. The honeycomb body has stacked and/or wound or coiled sheet layers, of which at least a portion are structured sheet layers, wherein the configuration has sheet layers of the second thickness, with which the lattice-like structure is formed. The sheet layers of the second thickness are connected by a procedure using intimate joining of the materials involved, preferably soldering, at contact locations, to at least one other sheet layer of the second thickness, and/or there blend into another sheet layer of the second thickness. In other words, the sheet layers that blend into each other are parts of the same sheet. This embodiment includes honeycomb bodies which are wound in a spiral configuration, honeycomb bodies which are constructed in an S-shape and other embodiments of previously known honeycomb bodies with stacked and/or wound sheet layers. In certain alternative forms of the embodiment the lattice-like structure is formed from one or more sheets of the first thickness, which are reinforced in a portion-wise manner by sheet strips which are connected thereto by a procedure using intimate joining of the materials involved. Those portions form the passage walls of the second thickness.

In a further embodiment, the lattice-like wall structure has a plurality of adjacent sheet layers of the second thickness, which have together, in respective pairs, a plurality of connecting locations, at least one of the sheet layers being a structured sheet layer.

In a development, the lattice-like structure extends with two or more sheet layers, as viewed in the cross-section of the honeycomb body, approximately along a line extending in the manner of a spiral arm, preferably approximately along an involute. In still another development the honeycomb body has in cross-section a plurality of lattice-structured spiral arms. The spiral arms are connected together in the region of a spiral core, wherein the spiral arms preferably include approximately equal angles between them, at the spiral core. In that respect the angle is to be measured between the lines connecting the center of the spiral core to the points of attachment of the spiral arms to the spiral core. The spiral arms, the spiral core and optionally a tubular casing connected to the outer ends of the spiral arms form a stable framework, between which the passage walls of the first thickness are disposed. In an alternative form of this development the inner ends of the spiral arms are not connected together by way of a spiral core, but are directly connected to each other. In that situation the spiral arms divide each imaginary circle with a center point in the proximity of the connecting region of the spiral arms, the peripheral line of which is cut by the spiral arms, into portions of approximately equal size.

In a further embodiment the honeycomb body is of a structure similar to that described in the European Patent EP 0 436 533 B1, with a stack of sheet layers, which stack is twisted in mutually opposite directions, wherein the lattice-like structure is disposed approximately at the center of the stack. In a development the stack includes further lattice-like structures, preferably such that an equal number of sheet layers are disposed between the lattice-like structures.

Other features which are considered as characteristic for the invention are set forth in the appended claims.

Although the invention is illustrated and described herein as embodied in a honeycomb body, in particular a catalytic converter carrier body, with a reinforced wall structure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
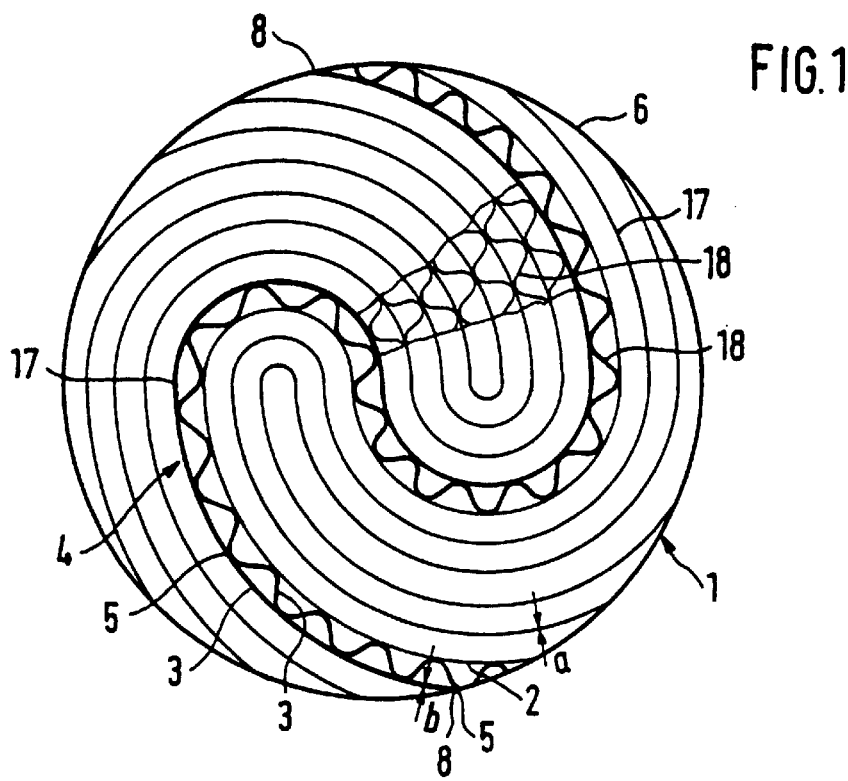
FIG. 1 is a diagrammatic, cross-sectional view of a honeycomb body with a stack, which is twisted in mutually opposite directions, of partially structured sheet layers, according to the invention.

In all the figures of the drawing, sub-features and integral parts that correspond to one another bear the same reference symbol in each case. Referring now to the figures of the drawing in detail and first, particularly, to FIG. 1 thereof, there is shown a honeycomb body 1 according to the invention with a stack, twisted in mutually opposite directions, of mutually alternate smooth sheet metals layers 17 and structured sheet metal layers 18. Approximately at its center, the stack includes a lattice-like structure 4 with a plurality of connecting locations 5, which is made up of two adjacent sheet layers 3. Those sheet layers 3 are sheet layers of a second thickness b. The other, oppositely twisted sheet layers are sheet layers 2 of a first thickness a. The stack is disposed in an interior of a tubular casing 6, wherein the lattice-like structure 4 is soldered to the tubular casing 6 at casing connecting locations 8. The solder connection or connections between the tubular casing 6 and the lattice-like structure 4 preferably extends or extend only over a portion or portions of an axial length of the tubular casing (not shown in the drawing) in order to permit different variations in length, due to thermal causes, of the tubular casing 6 and the wall structure. The sheet layers 2, 3 of the first thickness a and the second thickness b can be soldered together at some of or all their contact locations.

Figure 2:
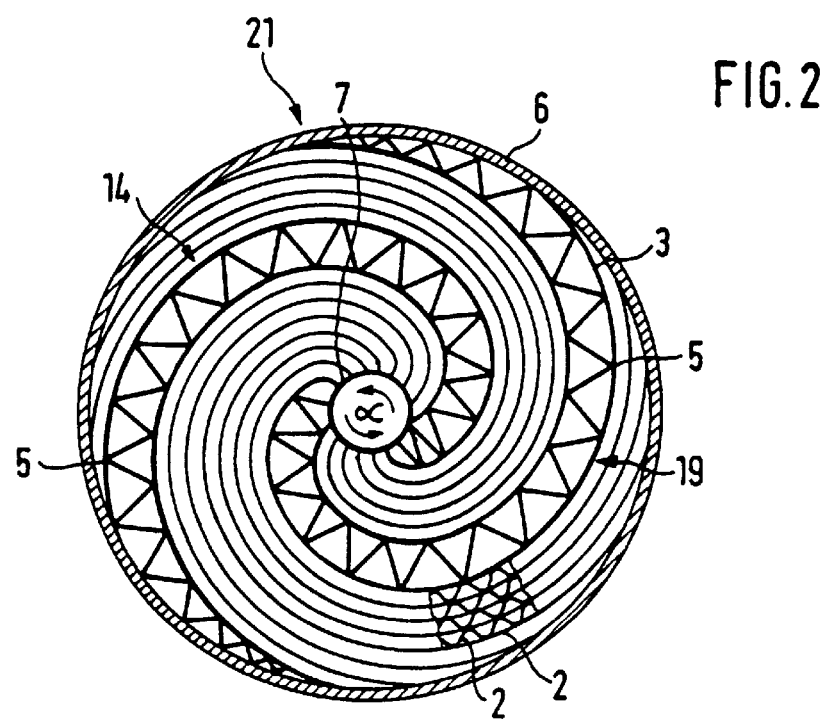
FIG. 2 is a cross-sectional view of the honeycomb body with spirally wound sheet layers.

FIG. 2 shows a honeycomb body 21 with wound or coiled sheet layers 2, 3 that extend in cross-section approximately along involutes. Disposed approximately on a center axis of the honeycomb body 21 is a spiral core 7 in the form of a hollow cylinder to which the sheet layers 2, 3 are connected. The honeycomb body 21 has two lattice-like wall structures 14 that in cross-section follow spiral arm-like lines. They are each made up of three sheet layers 3, two being smooth and there between a structured layer, and they are disposed approximately symmetrically relative to each other with respect to the center axis of the honeycomb body 21. The angle $\alpha$ that they include between them at the spiral core 7 is therefore approximately 180°.

Figure 3:
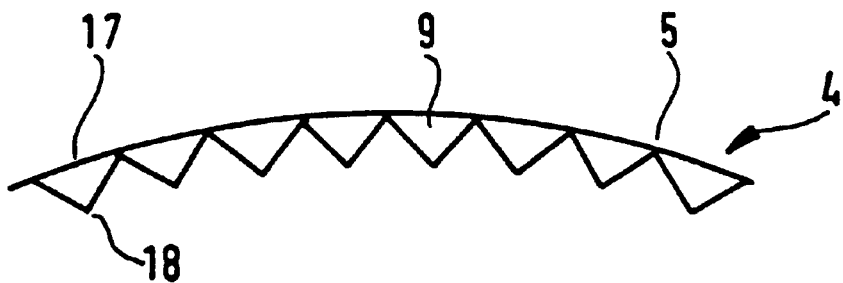
FIGS. 3 to 5 are fragmented, sectional views of lattice-like structures with adjacent sheet layers in profile.
Figure 4:
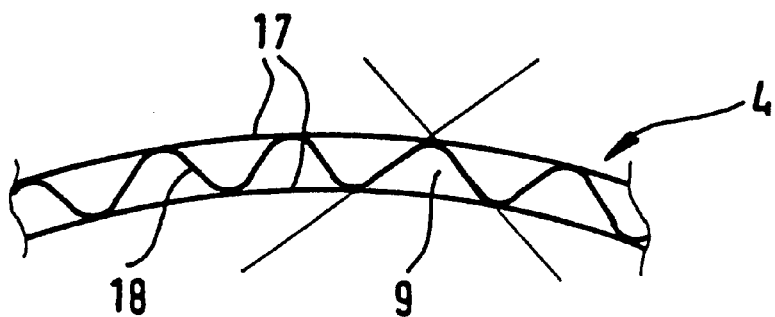
Figure 5:
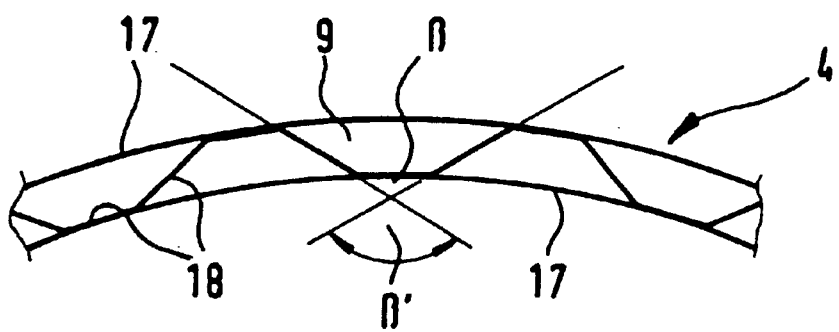

FIGS. 3 to 5 each show a portion of the lattice-like structure 4 having at least one smooth sheet layer 17 and the structured sheet layer 18, which are both of the second thickness b, and have a plurality of the connecting locations 5. The lattice-like structure 4 in FIG. 3 has triangular bordered passages 9. The passages 9 in FIG. 4 are approximately triangular in cross-section. Indicated by way of example with two lines that are straight lines along which the structured sheet layer 18 extends between the two smooth sheet layers 17. Of the smooth layers 17 at least one is of the second thickness b. The sheet layers 17; 18 of the second thickness b are connected together by a procedure involving intimate joining of the materials, at a plurality of their contact locations. If the second smooth sheet layer 17 in FIG. 4 is a sheet layer of the first thickness a, it is preferably also connected to the structured sheet layer 18 by the intimate joining method, at a plurality of its contact locations with respect to the structured sheet layer 18. FIG. 5 shows passages 9 of trapezoidal cross-sectional area. Lines indicate the direction along which there extend the lattice wall portions of the structured sheet layer 18, which connect the two smooth sheet layers 17 together. The two lines intersect outside the lattice cell 9 with an internal angle $\beta$. FIG. 5 also shows the opposite angle $\beta'$ which is equal to the angle $\beta$. The two lines make it possible to see the lattice construction which is basically of triangular cross-section and which imparts its stability to the structure.

As the examples show, embodiments of the honeycomb body 1 according to the invention are of a similar structure to previously known honeycomb bodies. With just minor modifications they can be produced by use of the same processes as the previously known honeycomb bodies. Honeycomb bodies with lattice-like structures can therefore be produced at approximately the same cost but they permit the use of thinner sheet layers or they have a higher degree of stability than previously known honeycomb bodies.

I claim:

1. A honeycomb body including a catalytic converter carrier body, comprising:

sheet layers being at least one of stacked and wound sheet layers having an interior, part of said sheet layers being structured sheet layers having passage wall surfaces defining a passage through which a fluid can flow, some of said sheet layers having a first thickness and others of said sheet layers having a second thickness being greater than said first thickness, at least two of said sheet layers of said second thickness forming a lattice-shaped structure in said interior and at least one of said at least two of said sheet layers of said lattice-shaped structure being a structured sheet layer and said at least two of said sheet layers of said lattice-shaped structure connected together at least in a location-wise manner by a procedure involving intimate joining of materials, a larger portion of said passage wall surfaces in said interior formed by said sheet layers of said first thickness than by said sheet layers of said second thickness and said first thickness being between 15 μm and 50 μm.

2. The honeycomb body according to claim 1, wherein said second thickness is at least 20% greater than said first thickness.

3. The honeycomb body according to claim 1, wherein said first thickness is between 20 and 30 μm.

4. The honeycomb body according to claim 2, wherein said first thickness is between 20 and 30 μm.

5. The honeycomb body according to claim 1, including a tubular casing having an interior receiving said sheet layers, said lattice-shaped structure having a plurality of casing connecting locations and at each of said casing connecting locations at least a respective one of said sheet layers of said second thickness forming said lattice-shaped structure is connected to said tubular casing.

6. The honeycomb body according to claim 5, wherein two of said casing connecting locations are connected together by said lattice-shaped structure.

7. The honeycomb body according to claim 1, wherein a sheet layer of said sheet layers having said second thickness is connected by said procedure involving intimate joining of materials to an adjacent sheet layer of said first thickness.

8. The honeycomb body according to claim 1, wherein said structured sheet layer of said lattice-shaped structure is a corrugated sheet layer having corrugation apexes and at least at a portion of said corrugation apexes is connected by said procedure involving the intimate joining of materials to an adjacent smooth sheet layer of said sheet layers having said second thickness.

9. The honeycomb body according to claim 1, wherein said lattice-shaped structure extends in cross-section substantially along a line extending in a manner of a spiral arm.

10. The honeycomb body according to claim 1, wherein said lattice-shaped structure extends in cross-section substantially along a line extending in a manner of an involute.

11. The honeycomb body according to claim 9, including a spiral core disposed in said interior, said lattice-shaped structure having a plurality of lattice-structured spiral arms connected together in a region of said spiral core, and said plurality of lattice-structured spiral arms have substantially equal angles between them at said spiral core.

12. The honeycomb body according to claim 1, wherein said sheet layers are twisted in opposite directions forming a stack having a center, and said lattice-shaped structure disposed approximately at said center of said stack.

* * * * *